United States Patent [19]

Miller

[11] 4,133,566
[45] Jan. 9, 1979

[54] HIGH PRESSURE DUCT CLAMP AND METHOD OF USE

[76] Inventor: Robert B. Miller, RD. #1, Box 191, Malvern, Pa. 19355

[21] Appl. No.: 809,489

[22] Filed: Jun. 23, 1977

[51] Int. Cl.² .............................................. F16L 17/00
[52] U.S. Cl. ..................... 285/350; 285/364; 285/382.2; 285/424; 29/526 R; 29/521; 29/463; 29/509
[58] Field of Search ............... 285/336, 364, 406, 424, 285/420, 382.1, 382.2; 403/331, 335, 338, 313, 309; 24/23 W, 73 BP, 73 AS; 29/526, 521, 400 D, 437, 439, 515, 514, 416, 505

[56] References Cited

U.S. PATENT DOCUMENTS

| 2,451,941 | 10/1948 | Glover, Jr. et al. | 285/364 |
| 2,491,700 | 12/1949 | Zwerling | 285/406 X |
| 3,198,561 | 8/1965 | Witt | 285/364 |
| 3,199,901 | 8/1965 | Jeppsson | 285/364 |
| 3,237,255 | 3/1966 | Stanton | 24/23 W X |

FOREIGN PATENT DOCUMENTS

| 243931 | 5/1960 | Australia | 285/424 |
| 112283 | 11/1968 | Denmark | 285/55 |
| 116612 | 4/1969 | Norway | 285/364 |

Primary Examiner—Werner H. Schroeder
Assistant Examiner—Carl J. Arbes
Attorney, Agent, or Firm—J. Rodman Steele, Jr.

[57] ABSTRACT

A method and apparatus for permanently and sealably connecting two duct sections, the duct sections having peripheral flanges forming opposite and corresponding halves of a composite, T-shaped peripheral flange extending outwardly from the duct sections. The composite flange has an upper cross-piece portion and a lower upright portion, the lower upright portion of the T-shaped flange containing a continuous reservoir of deformable gasket material. The method comprises the steps of first placing square-cornered, U-shaped clamps over the upper cross-piece portion of the T-shaped flange at spaced intervals thereon; secondly, pressing sides of each of the clamps inwardly and crimping the clamps to upper and lower surfaces of the upper cross-piece portion, forcing a portion of the gasket material to flow from the reservoir between the flange halves, towards the duct sections, thereby producing a sealed joint between the duct sections; and thirdly, rippling each of the clamps simultaneously with the upper cross-piece portion adjacent each of the clamps, causing undulations in both which prevent the clamps from slipping out of clamping contact with the upper portion of the T-shaped flange, thereby permanently connecting the duct sections.

10 Claims, 5 Drawing Figures

HIGH PRESSURE DUCT CLAMP AND METHOD OF USE

BACKGROUND OF THE INVENTION

1. Field of the Invention

This invention relates to high pressure duct connections, and more particularly, to an improved method and apparatus for making such connections for air ducts made of sheet metal.

2. Description of the Prior Art

Various types of sealed joints for flanged pipes and ducts have been suggested. Most of these have been difficult to assemble, unnecessarily complex and expensive, and have required separate or extra parts which could be easily lost or had other objectionable characteristics. Many of these disadvantages were overcome in the high pressure duct connection disclosed in U.S. Pat. No. 3,198,561, which patent is assigned to the assignee of the present invention. In aforementioned U.S. Pat. No. 3,198,561, a particular flanged duct connection was described and a C-shaped clamp and wedge arrangement was disclosed for clamping together the duct sections. The present invention is particularly directed to an improved method and apparatus for clamping duct sections, particularly those with flanged arrangements similar to U.S. Pat. No. 3,198,561. The clamp according to the present invention is significantly easier and less expensive to manufacture, requires no more effort to install than the old clamp and further provides a permanent connection, not previously available without having to use nuts and bolts, screws, or rivets.

When two duct sections have been clamped together according to the method of the present invention, the clamp bears somewhat of a resemblance to the type of clamp most commonly known as a "drive-and-slide" clamp. Such a clamp is disclosed for example in U.S. Pat. No. 3,199,901 and British Pat. No. 1,346,366. The clamps disclosed in both of these references rely on the spring tension inherent in the shaped metal forming the clamp. The resulting connection is neither permanent nor positive, since the clamp is subject to bowing out and thereby loosening over time. If the duct is subject to vibrational load stresses, this loosening effect can take place more rapidly.

In contrast to the foregoing, a clamp applied according to the method of the present invention is little more than negligibly susceptible to loosening under vibrational load stress. Further, even should the clamp of the present invention become somewhat loose, its method of application prevents it from slipping and maintains the integrity of the sealed connection.

BRIEF SUMMARY OF THE INVENTION

Accordingly, it is a principal object of the present invention to provide a permanently attachable clamp for high pressure duct connections, particularly for sheet metal ducts, which is both simple in construction and easy to install, and which results in a permanent, sealed joint.

It is a further object of the present invention to provide a permanent clamp for high pressure duct connections, particularly for air ducts of sheet metal, in which the duct has an integral flange applied thereto prior to installation and which is quickly and easily assembled at the point of use.

It is a still further object of the present invention to provide a method for installing a clamp for high pressure duct connections, which method does not rely upon bolts, screws or rivets.

It is a still further object of the present invention to provide a clamp for high pressure duct connections, which ducts are provided with sealing flanges, the application of which clamp does not require that any holes be made in the duct or flange for installation of the clamp.

It is yet another object of the present invention to provide a clamp for making permanent high pressure duct connections, which clamp can be used in place of, or in conjunction with existing removable clamps.

The method according to the present invention for making a permanent, high pressure duct connection between two sheet metal duct sections is particularly directed to the kind of duct and flange arrangement disclosed in U.S. Pat. No. 3,198,561. In the duct-joint system disclosed therein, the duct sections have peripheral flanges welded to the duct sections forming opposite and corresponding halves of a composite, T-shaped peripheral flange extending outwardly from the duct sections, having an upper cross-piece portion and a lower upright portion, the lower upright portion of the T-shaped flange having a continuous reservoir of deformable gasket material in a substantially cylindrical space. The improved clamp is U-shaped with square corners. The clamp is placed over the cross-piece portion of the T-shaped flange, such that the sides of the clamp may be pressed inwardly enveloping a section of the cross-piece portion. The inner surfaces of the clamp are pressed against the upper and lower surfaces, as well as the outer edges of each of the cross-piece portions of the flange halves, and are crimped tightly thereto. This forces a portion of the gasket material to flow out of the reservoir between the flange halves, inwardly towards the duct sections, and results in a completely sealed joint between the duct sections. As a final step, or as a step made simultaneously with crimping, the clamp and the adjacent portion of the upper cross-piece portion of the flange are simultaneously rippled, causing substantially parallel undulations in both. These undulations prevent the clamp from slipping out of clamping contact with the upper cross-piece portion of the T-shaped flange, thereby insuring that the duct connection will be permanent.

BRIEF DESCRIPTION OF THE DRAWINGS

For the purposes of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENT

Figure 1:
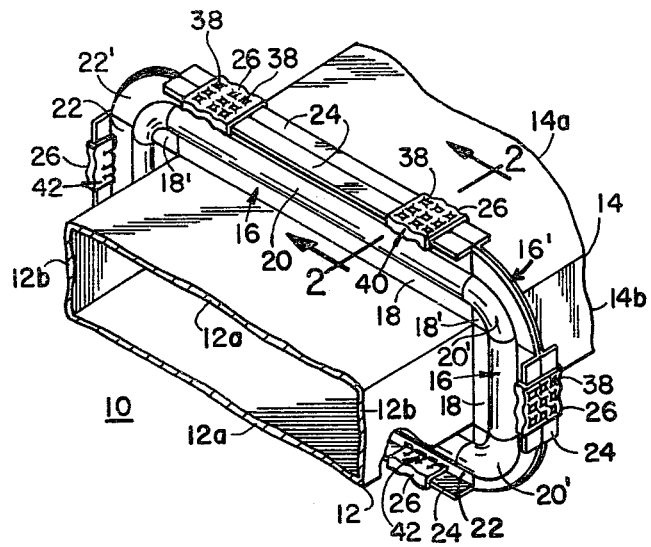
FIG. 1 is a view in perspective of two duct sections connected in accordance with the present invention.

With reference to the drawings, wherein like numerals refer to like parts, there is shown in FIG. 1 a high pressure duct connection designated generally by numeral 10 made according to the present invention. The shape of the duct is not critical, as will become apparent, since the duct connection is equally suitable for various shapes of duct sections. Rectangularly shaped duct sections 12 and 14 are specifically illustrated, and are particularly useful for purposes of explanation since they involve additional problems at the corners which do not occur with circular ducts and since they are extensively used to save space.

Duct section 12 has two pairs of enclosing walls, 12a and 12b, both made from sheet metal. Likewise, rectangularly shaped duct section 14 has opposite pairs of enclosing walls 14a and 14b, each also made of sheet metal. With additional reference to FIG. 2, each of the duct sections has a flange, designated generally by numeral 16, extending perpendicularly outwardly from the ends thereof. In order to complete the corners and insure a continuous seal at these locations, corner flanges, designated generally by the numeral 16', are secured at their end margins, preferably by welding, to the end margins of the flanges 16 and the duct sections 12 and 14.

Each of the flanges 16 has a flat flange portion 18 extending perpendicularly with respect to and along the ends of the walls 12a, 12b, 14a and 14b, being also perpendicular to the longitudinal axes of the duct sections 12 and 14. Extending beyond the flat flange portion 18 and extending therealong for the length of the flat flange portion 18 is an outwardly convexed curved, and preferably substantially semi-cylindrical flange portion 20 which provides a groove or reservoir to receive sealing material 44. Extending beyond the semi-cylindrical flange portion 20 is a second flat flange portion 22. Extending from the top of the second flat flange portion 22 backwardly along each of the duct sections and parallel thereto, is a cross-piece flange section 24.

In a similar fashion, each of the corner flanged inserts 16' is provided with a flat section 18', an outwardly convexed curved, and preferably substantially semi-cylindrical flange portion 20' and a second flat flange portion 22'. In the rectangular duct configuration shown, it is not necessary that the corner flange inserts be provided with cross-piece members which would correspond to cross-piece members 24. When using the original clamps disclosed in U.S. Pat. No. 3,198,561 this discontinuity in the upper cross-piece portion 24 of the peripheral flange was necessary to facilitate placement of the C-shaped clamping members. In view of the fact that the improved clamps according to the present invention are simply placed over the cross-piece portion 24 of the peripheral flange, as will be explained hereinafter in more detail, such discontinuities are not necessary. The clamps according to the present invention are preferably installed at 12-inch intervals, although depending on the particular shape of the duct, this distance may be somewhat shorter or longer. It may be seen, then, that the cross-piece portion of the peripheral flange, when used in accordance with the method of clamping according to the present invention, may be continuous with the flange or need be present only at those intervals, or for intervals, where clamping is required.

Figure 2:
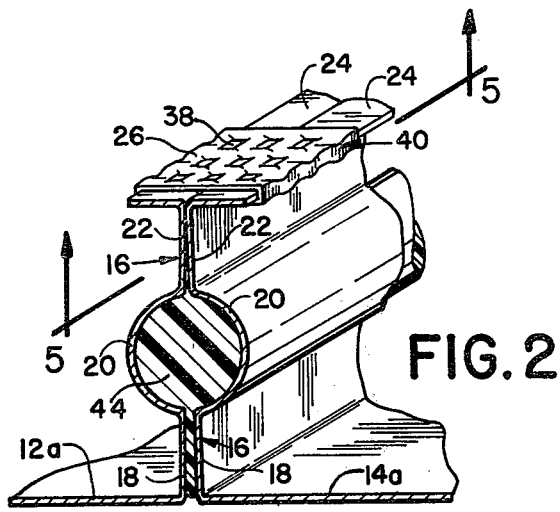
FIG. 2 is an enlarged sectional view in perspective taken along the line 2—2 of FIG. 1, showing the details of the flange, seal and clamp.

With particular reference to FIGS. 1 and 2, it is apparent that the flanged configuration of the high pressure duct connection according to the present invention may also be characterized as two duct sections 12 and 14, each of the duct sections having peripheral flanges 16 and 16' forming opposite and corresponding halves of a composite, T-shaped peripheral flange extending outwardly from the duct sections, the composite flange having an upper cross-piece portion and a lower upright portion, with the lower upright portion of the composite flange containing a continuous reservoir of deformable gasket material.

Figure 3:
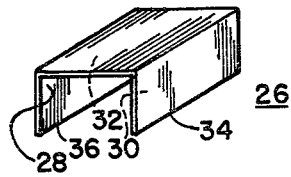
FIG. 3 is a view in perspective of a clamp according to the present invention prior to attachment.
Figure 4:
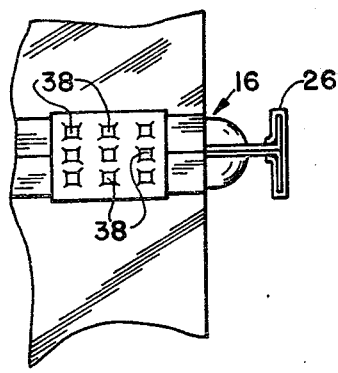
FIG. 4 shows top and side views of clamps applied in accordance with the present invention; and, FIG. 5 is a sectional view taken along the line 5—5 of FIG. 2 showing the underside of a clamp crimped according to the present invention.
Figure 5:
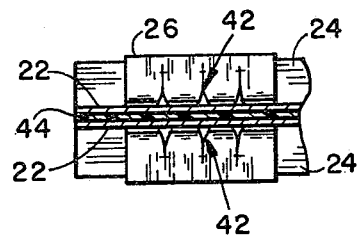

The shape of the uncrimped clamp 26 is shown in FIG. 3. It is substantially U-shaped with square corners. The dimensions of the clamp 26 are such that it is substantially as wide as the width of the composite cross-piece section of the peripheral flange, formed by two cross-piece flange sections 24. The sides of the clamp are sufficiently long to be pressed around the lower surfaces of cross-piece flange sections 24 and have their ends abut against the surfaces of second flat flange portions 22 as shown in FIG. 4. When so clamped, the inner surface 32 of clamp 26 will engage the upper surfaces of cross-piece flange sections 24 and the inside surfaces of sides 28 and 30 of clamp 26 will engage the lower surfaces of cross-piece flange sections 24. The edges 34 and 36 of the sides of clamp 26 will abut against the surfaces of second flat flange portions 22.

Merely by way of specific illustration for one embodiment, and with no intention to be limited thereby, the clamp may be constructed from 0.030 inch thick steel and have the following dimensions: 1⅜ inches long, ⅝ of an inch across the base of the "U" (corresponding to the width of two cross-piece flange sections 24) and sides which are ⅜ of an inch deep. If the clamp is made from a softer metal, for example, aluminum, it must be proportionally thicker to achieve the same holding strength as steel.

As the sides of the clamps are pressed tightly againt the cross-piece portions of the peripheral flange, the clamps are crimped to the cross-piece sections with a plurality of upper crimps 38 and lower crimps 42. After the clamps have been crimped, or simultaneous with said crimping, both the clamps and adjacent portions of the cross-piece flange sections are simultaneously rippled. The resulting ripples or undulations, designated generally by numeral 40, in both the clamps and adjacent flange sections, as shown particularly in FIGS. 1 and 2, assure that the clamps cannot slip out of clamping contact with the cross-piece flange sections. Preferably, each series of ripples has at least three undulations. As is particularly apparent in FIG. 2, in the sense of FIG. 2, the ripples 40 form up-and-down undulations. Hence, the use of straight lines 40 depict the edges of clamp 26 in FIG. 4. The crimps 38 and 42, and ripples 40 can be formed by crimping tools known in the art, and need not be described herein in detail.

The gasket material 44 can be of any desired material which is deformable, permanently plastic, adherent, free from odor, and not corrosive to the duct sections 12 and 14. It is preferred that it be round in cross-section with a diameter greater than that of the curved flange portions 20 and 20'. If, for example, the curved flange portions 20 and 20' have an inside diameter of ⅜ of an inch, the preferred dimensions for the gasket material would be a diameter of 7/16ths of an inch. Any composition having the desired characteristics can be employed for the gasket material 44 but it preferably includes a synthetic resin vehicle with an asbestos fiber filler, such as described in aforementioned U.S. Pat. No. 3,198,561.

Due to the fact that more gasket material 44 is used than will fit into the reservoir formed by substantially semi-cylindrical flange portions 20 and 20', a portion of the gasket material will be forced to flow out of the reservoir when the duct sections 12 and 14 are aligned and clamped together. The clamping action according to the present invention applies pressure at the tops of the second flat flange portions 22, so they are substantially touching one another at that point. Although some gasket material may be drawn upwardly by capillary action or the like, most of the gasket material forced out of the reservoir will be forced to flow downwardly towards the duct sections, causing a layer of gasket material to separate first flat flange sections 18 as shown in FIG. 2. This reservoir overflow technique insures that the joint will be completely sealed.

The present invention may be embodied in other specific forms without departing from the spirit or essential attributes thereof, and accordingly, reference should be made to the appended claims, rather than to the foregoing specification as indicating the scope of the invention.

I claim:

1. An improved duct joint for permanently and sealably connecting two duct sections, said duct sections having peripheral flanges forming opposite and corresponding halves of a composite, T-shaped, peripheral flange extending outwardly from said duct sections, said composite flange having an upper cross-piece portion and a lower upright portion, said lower upright portion containing a continuous reservoir of deformable gasket material, the improvement comprising:

a plurality of clamps crimped to said upper portion of said T-shaped flange at spaced intervals thereon, the inner surface of the each of said clamps being pressed against upper and lower surfaces of said upper cross-piece portion co-extensive with said clamps, said upper portions being thereby pressed together with sufficient pressure to force a portion of said gasket material to flow out from said reservoir between said flange halves toward said duct sections and produce a sealed joint therebetween; and, each of said plurality of clamps and corresponding co-extensive sections of said upper cross-piece portion having a series of ripples therethrough, said series of ripples preventing said plurality of clamps from slipping out of clamping contact with said upper portion of said T-shaped flange, thereby permanently connecting said duct sections.

2. The duct joint of claim 1, wherein prior to crimping, said clamps are U-shaped with square corners.

3. The duct joint of claim 1 wherein said upper cross-piece portion of said composite T-shaped peripheral flange has at least one discontinuity.

4. The duct joint of claim 1, wherein said duct sections have rectangular cross-sections, and said upper cross-piece portion is discontinuous at each of the corners of said duct sections.

5. The duct joint of claim 1, wherein said clamps are formed from at least 0.030 inch thick steel.

6. A process for permanently and sealably connecting two duct sections, said duct sections having peripheral flanges forming opposite and corresponding halves of a composite, T-shaped peripheral flange extending outwardly from said duct sections, said composite peripheral flange having an upper cross-piece portion and a lower upright portion, the lower upright portion containing a continuous reservoir of deformable gasket material, comprising the steps of:

placing clamps over said upper portion of said T-shaped flange at spaced intervals thereon;
pressing sides of each of said clamps inwardly and crimping said clamps to upper and lower surfaces of said upper cross-piece portion, said upper portions being thereby pressed together with sufficient pressure to force a portion of said gasket material to flow from said reservoir between said flange halves toward said duct sections and produce a sealed joint therebetween; and,
rippling each of said clamps simultaneously with adjacent sections of said upper portion, causing undulations in both which prevent said clamps from slipping out of clamping contact with said upper portion of said flange, thereby permanently connecting said duct sections.

7. The process of claim 6, wherein said crimping and rippling steps are performed substantially simultaneously.

8. The process of claim 6, wherein prior to pressing, said clamps are U-shaped with square corners.

9. The process of claim 6, wherein said upper cross-piece portion of said composite T-shaped flange has at least one discontinuity.

10. The process of claim 6, wherein said clamps are formed from at least 0.030 inch thick steel.

* * * * *